United States Patent

[11] 3,581,778

| [72] | Inventors | Alfred Korejwa<br>Crestline;<br>Walter J. Layer; Richard E. Ruda, both of<br>Bucyrus, all of, Ohio |
|---|---|---|
| [21] | Appl. No. | 849,951 |
| [22] | Filed | Aug. 14, 1969 |
| [45] | Patented | June 1, 1971 |
| [73] | Assignee | Amerace Esna Corporation<br>New York, N.Y. |

[54] OBLONG HOSE
15 Claims, 2 Drawing Figs.

[52] U.S. Cl. .................................................. 138/119,
138/137, 264/230
[51] Int. Cl. .................................................. F16l 11/04
[50] Field of Search .................................................. 264/166,
209, 230; 138/118—139, 177, 178

[56] References Cited
UNITED STATES PATENTS

| 2,692,406 | 10/1954 | Rhodes et al. | 264/230 |
| 2,833,313 | 5/1958 | Penman | 138/125 |
| 2,886,853 | 5/1959 | Herman et al. | 264/230 |
| 3,086,242 | 4/1963 | Cook et al. | 264/230 |
| 3,225,129 | 12/1965 | Taylor et al. | 264/230 |
| 3,364,632 | 1/1968 | Isaac | 138/119 |

*Primary Examiner*—Houston S. Bell, Jr.
*Attorney*—Richard A. Craig

ABSTRACT: A hose is provided normally having an oblong inside transverse cross section and being of a material having elastic memory. In use, a source of fluid pressure coupled to one end of the hose will cause the hose's normal oblong inside transverse cross section to substantially circularize thereby permitting efficient movement of the fluid therethrough. However, upon interruption or cessation of the fluid pressure, the elastic memory of the material causes the hose to substantially immediately return to its normal oblong or flattened cross-sectioned shape thereby expelling any residual fluid therein through the hose's other end. Several processes for fabricating such hose are also disclosed.

PATENTED JUN 1 1971

3,581,778

ALFRED KOREJWA
WALTER J. LAYER
RICHARD E. RUDA
*INVENTORS*

BY *Richard A. Craig*

ATTORNEY 3,581,778

OBLONG HOSE

BACKGROUND OF THE INVENTION

Hose having a round transverse cross section exhibits shortcomings in certain circumstances of storage and use. For example, conventional hose is particularly subject to kinking and is twisting and otherwise unwieldy during normal handling. Further, circular cross section hose is by nature demanding of certain space commitments for storage.

Additionally, fluid tends to remain in circular hose, when fluid pressure is interrupted or removed. Should outside temperatures fall below the freezing point of the fluid within, such fluid can freeze and thereby block the hose and render it inoperable.

It has long been the desire of the fluid transport industry to provide hose free of the above shortcomings. This invention does so.

SUMMARY OF THE INVENTION

It is a primary object of this invention to provide an improved hose having improved kink and twist resistance and handling properties over conventional hose, and requiring less storage space. It is another object to provide hose having a self-draining capacity. It is an additional object to provide processes for producing such hose.

The above and other objects are met in a hose normally having an oblong or flattened inside transverse cross section and being adapted to assume a nonflattened substantially cylindrical cross section in response to a fluid pressure applied through one end of the hose. The material of the hose has elastic memory and thus provides means for causing the hose to substantially immediately return to its normal oblong or flattened condition upon the interruption or cessation of the fluid pressure whereby any residual fluid remaining in the hose is automatically expelled through the latter's open end. The hose may include reinforcement as required by the circumstances of use to be encountered.

DESCRIPTION OF THE INVENTION

Figure 1:
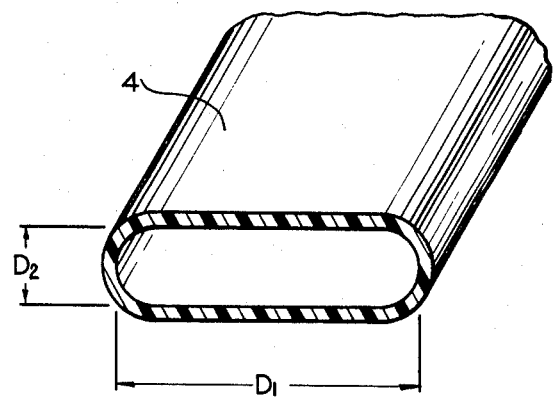
FIG. 1 is a fragmentary perspective view in transverse section of an oblong nonreinforced hose of the invention.

Referring now to FIG. 1, there is schematically shown a flexible tubular nonreinforced hose 4 normally having an oblong transverse cross section. Thus, as indicated, hose 4 has in inside cross section, a major dimension $D_1$ and a minor dimension $D_2$, with the dimension $D_1$ being substantially greater than the dimension $D_2$. This gives to the hose 4 a characteristic flattened ribbonlike appearance in the unpressurized or non-fluid-conveying state.

In accordance with the present invention, the flexible normally oblong tubular hose 4 is fabricated from a material having elastic memory. The term "elastic memory" as employed herein and throughout the appended claims refers to the intrinsic ability of the hose material to substantially recover its original size and shape after it has been deformed.

Materials having an elastic memory and suitable for this invention, when performed into the tubular oblong-shaped hose of FIG. 1, have the ability to assume a substantially circular inside transverse cross-sectional configuration in a controlled fashion under pressure and to return to their initial oblong configuration in the absence of or during the interruption of such pressure. Suitable materials which have such elastic memory and which can be used in practicing this invention include elastomers and elastomeric compounds, both thermoplastic and thermosetting. Particularly preferred materials include plasticized polyvinyl chloride and natural and/or synthetic rubber compounds.

For best practical results the ratio of cross-sectional dimension $D_1$ to cross-sectional dimension $D_2$ should be at least about 4 to 1, although satisfactory results have been obtained with lower ratios than 4 to 1. It has been discovered that hoses fabricated of a material having an elastic memory and having the configuration shown in FIG. 1 exhibit significant self-draining properties, that is, as mentioned above they change under fluid pressure from their original oblong shape to a substantially circular or cylindrical shape for efficient fluid movement and, upon cessation or interruption of fluid pressure, they immediately and automatically assume the initial oblong configuration, thereby discharging fluid that would remain in conventional circular hose. What is believed to actually happen is that as the oblong-shaped hose deforms into a substantially cylindrically shaped hose in response to a fluid pressure applied therein through one of its ends, energy is absorbed from the pressurized fluid and temporarily stored in the hose material itself much like a spring absorbs and stores energy upon being displaced. Consequently, upon cessation or interruption of the fluid pressure, the stored energy in the elastic memory hose material is released in the form of a positive spring-restoring force which, in turn, acts to immediately and forcibly restore the hose to its original oblong or "memorized" shape thereby expelling substantially all of the residual fluid through the hose's open end. Thus, should, outside temperatures fall below the fluid-freezing level, the oblong hose according to the present invention, having discharged substantially all its residual fluid, is not subject to becoming blocked on reapplication of fluid pressure.

Moreover, owing to its flattened ribbonlike condition in the unpressurized state, it will be appreciated that such hose is easily coiled and takes up less room than conventional hose. Further, oblong hose tends to resist kinking and twisting far better than conventional circular hose.

Generally, the modulus of elasticity of the elastic memory material should be from about 200 pounds per square inch (p.s.i.) to about 4,000 p.s.i. at 100 percent stress and the wall thickness of hose 4 should be from about 0.01 to 0.25 inch, although other thicknesses can be employed.

Figure 2:
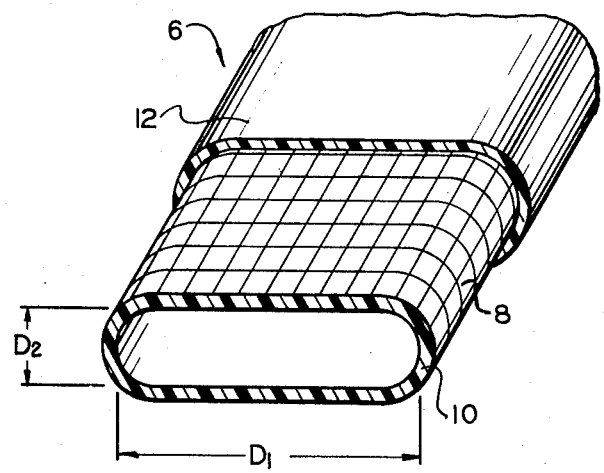
FIG. 2 is a view similar to FIG. 1, but showing a reinforced hose of the invention.

As illustrated in FIG. 2, a reinforced hose 6 includes a reinforcing layer 8 applied about an inner core 10 and over which is applied an outer cover 12 bonded to the inner core 10 and/or reinforcing layer 8.

Inner core 10 may be identical to nonreinforced hose 4. Outer cover 12 is of a material compatible with inner core 10 and reinforcing layer 8. The reinforcing layer 8 may consist of natural or synthetic fibers or fabrics. The layer 8 is applied about the inner core 10 such that it can move with the inner core 10. Generally, a single layer 8 is used although more than one such layer can be employed. If necessary, a tackifier (adhesion inducer) is employed to bind the components of hose 6 together.

Processes are provided for making oblong hose embodying the present invention.

A thermoplastic nonreinforced hose 4 of the invention is produced by feeding an extrudable thermoplastic material into a conventional extruder. Instead of a conventional circular die, an oblong die of suitable configuration is employed to form the hose 4.

A process is provided for producing a reinforced hose 6 having a thermoplastic inner core 10, a reinforcing layer 8 and a thermoplastic outer cover 12. The process may be carried out continuously or in batchwise fashion. A thermoplastic material having an elastic memory is fed into an extruder. The extruder employs the previously described oblong die to form an oblong inner core 10. The inner core 10 is passed through a cooling medium to solidify it. Next, the inner core 10 is rounded out, as by an internal air bubble, prior to application of reinforcing layer 8, to facilitate uniform application thereof by conventional equipment, and reinforcing layer 8 is then applied to the rounded out inner core 10. The inner core 10 with reinforcing layer 8 thereon is thereafter passed into an evacuated chamber, thus creating a vacuum about the periphery of the structure to round it out prior to and during the extrusion of the outer cover 12 thereon. Concurrently, a thermoplastic elastomer is extruded about the structure to form outer cover 12. The hose is cooled to solidify the outer cover 12 and during cooling assumes the desired oblong shape due to the elastic memory of inner core 10.

A process is provided for producing a nonreinforced oblong hose 4 from thermosetting materials by feeding an extrudable thermoset material into an extruder. Instead of a conventional circular die, an oblong die of suitable design is employed to form the hose. After extrusion the hose is cured by conventional methods, thus to provide the desired oblong nonreinforced thermosetting hose 4.

A process is also provided to produce a reinforced oblong hose 6 employing thermosetting materials having an elastic memory. Basically, a conventional uncured circular reinforced hose is prepared employing conventional technology. In one embodiment, a rigid sheath (such as lead) is extruded about the uncured circular hose employing an oblong die. Thereafter the sheathed hose is cured by conventional means. Then, the sheath is stripped off the cured hose 6.

In another embodiment an uncured conventional circular reinforced hose is prepared and a sheath is formed about the hose employing a conventional die having a circular cross section. Thereafter, the uncured sheathed hose is made oblong between forming rollers. Next, the hose is cured and the sheath is removed, resulting in the desired hose 6.

Other modifications in rigid sheath operation are possible, such as employing an oblong mandrel which imparts the desired shape to hose 6, and is thereafter removed.

Also, the rigid sheath applicator could be replaced by other molding and/or shaping devices to form the oblong hose 6.

The following examples are given to further illustrate the invention and are not limitative of scope.

EXAMPLE I

A nonreinforced oblong hose 4 was formed by extruding a plasticized polyvinyl chloride compound about an oblong die to form hose 4 with a nominal circular internal diameter of five-eighths inch and a wall thickness of 0.065 inch. The cross-sectional dimension $D_1$ was approximately 5 times the cross-sectional dimension $D_2$. The hose was conveniently wound into a compact package which occupied approximately 60 percent less space than an equal length of equivalent circular cross section hose. The hose 4 resisted kinking and twisting during packaging and removal for subsequent use. The hose readily changed to a circular configuration as water pressure was applied and self-drained most of the residual water after water pressure was removed.

EXAMPLE II

A plasticized polyvinyl chloride inner core 10 was prepared according to Example I. Air was introduced at the lead end of the inner core 10 to round it out. A knitting machine applied 12½ courses per inch of nylon yarn to form reinforcing layer 8. A tackifier was applied to the reinforced core.

A vacuum was applied to the periphery of the reinforced core to circularize the hose. An outer cover 12 of plasticized polyvinyl chloride was extruded around the reinforced core. The thickness of the outer cover 12 was 0.035 inch. The hose was cooled in a water bath after exiting the extruder die and during cooling the hose assumed an oblong shape due to the elastic memory of inner core 10. The reinforced hose 6 thus produced was easily formed into a compact package which occupied approximately 50 percent less space than an equal length of equivalent circular cross section hose. The hose 6 circularized under hydrostatic pressure and exhibited excellent self-draining properties when pressure was removed. The hose recovered immediately from twisting forces applied in opposite directions at either end.

Tests were conducted to compare the performance characteristics of oblong hose 6 of polyvinyl chloride with conventional circular hose having an equivalent circular diameter and construction. Hydrostatic impulse at elevated pressures, flexure in the area adjacent to the coupling, flow rate, hydrostatic burst and drag-abrasion tests were conducted. Results in all cases showed the oblong hose to perform equal to or better than the equivalent circular hose.

EXAMPLE III

A nonreinforced oblong hose 4 with a nominal circular internal diameter of five-eighths inch and a wall thickness of 0.150 inch was formed by extruding an EPDM synthetic rubber compound about an oblong die and then placing the hose on a metallic curing tray and subsequently vulcanizing in an autoclave for 30 minutes at 320° F. The cross-sectional dimension $D_1$ was approximately 5 times the cross-sectional dimension $D_2$. The resultant hose 4 was conveniently wound into a compact package which occupied approximately 60 percent less space than an equal length of circular hose having an equivalent cross section. The hose 6 resisted kinking and twisting during packaging and removal therefrom for subsequent use. The hose 6 further readily changed to a circular configuration as water pressure was applied and self-drained most of the residual water after the water pressure was removed.

EXAMPLE IV

A reinforced uncured circular hose of nominal five-eighths inch internal diameter having an inner core of rubber, an outer cover of rubber and a reinforcing layer was prepared. The hose was introduced into a conventional lead press having a conventional circular die and a circular lead sheath was applied to said reinforced hose. Thereafter, the uncured sheathed hose was flattened between a pair of rollers such that the ratio of cross-sectional dimension $D_1$ to cross-sectional dimension $D_2$ was about 4 to 1. The sheathed hose was cured and the sheath was removed. The reinforced hose 6 thus produced was easily formed into a compact package which occupied approximately 45 percent less space than an equal length of equivalent circular cross section hose. The hose 6 circularized under hydrostatic pressure and exhibited self-draining properties when pressure was removed. The hose recovered its original configuration immediately after twisting pressures were applied to make it pretzel shaped.

It will be appreciated that in each of the aforementioned examples, the hose was readily circularized or rounded out by application of water pressure made available from a conventional source such as a sink faucet or household water tap. Obviously, the minimum pressure required to substantially circularize a hose according to the present invention will depend upon many factors including, for example, the wall thickness of the hose, its modulus of elasticity, the type and amount of reinforcing material employed, the ambient temperature and so on, and the minimum pressure will vary as these factors are varied to meet individual requirements. Accordingly, the term "predetermined pressure" as used in the appended claims will be understood to refer broadly to a minimum pressure required to substantially circularize an oblong hose of given characteristics and should not be limited to a single or critical value.

We claim:
1. Hose means comprising:
    a longitudinally extending flexible tubular member adapted to be coupled to a source of fluid pressure and having at least one free end,
    said tubular member normally having an oblong inside transverse cross section for defining a flattened ribbonlike condition along substantially its entire length,
    said tubular member being adapted to assume a flexible nonflattened substantially cylindrical condition along substantially its entire length in response to a fluid of predetermined pressure introduced therein from said source, said tubular member being of a material having elastic memory, said elastic memory material providing means for urging said tubular member to substantially immediately return to said normal flattened ribbonlike condition upon the interruption of said fluid of predetermined pressure whereby any fluid tending to remain in said tubular member during said interruption is expelled through said at least one free end by the action of said elastic memory causing said tubular member to return to its normal flattened ribbonlike condition.

2. The hose means of claim 1 wherein said oblong inside transverse cross section of said tubular member when the latter is in its normal flattened ribbonlike condition is characterized by a major inside transverse dimension $D_1$ and a minor inside transverse dimension $D_2$ which is substantially less than dimension $D_1$.

3. The hose means of claim 2 wherein the ratio of dimension $D_1$ to dimension $D_2$ is at least about 4 to 1.

4. The hose means of claim 1 wherein the modulus of elasticity of the material at 100 percent stress is in the range of from about 200 pounds per square inch to about 4,000 pounds per square inch.

5. The hose means of claim 1 wherein said tubular member has a substantially constant wall thickness and is substantially homogeneous.

6. The means of claim 5 wherein the wall thickness of said tubular member is from about 0.01 inch to about 0.25 inch and, when made circular said tubular member has an inside diameter from about three-eighths inch to about 1 inch.

7. The hose means of claim 1 wherein said elastic memory material is a thermoplastic extruded in said normal flattened ribbonlike condition.

8. The means of claim 7 wherein said thermoplastic elastic memory material is plasticized polyvinyl chloride.

9. The hose means of claim 1 wherein said elastic memory material is a thermosetting material completely cured in said flattened ribbonlike condition.

10. The hose means of claim 9 wherein said thermosetting elastic memory material is rubber.

11. The article defined in claim 1 wherein said hose means is nonreinforced and consists of said tubular member.

12. The article defined in claim 1 wherein said flexible tubular member is reinforced and includes a flexible reinforcing layer integral therewith.

13. The article defined in claim 1 wherein said tubular member is reinforced and functions as an inner core and said hose means includes a reinforcing layer surrounding and engaging said tubular member throughout the length thereof and capable of moving with said tubular member and an outer cover of material having elastic memory surrounding and engaging said reinforcing layer throughout the length thereof and capable of moving with said tubular member and said reinforcing layer.

14. The hose apparatus of claim 13 wherein said outer cover also engages said tubular member through said reinforcing layer.

15. The hose apparatus of claim 13 wherein said reinforcing layer consists of nylon.